United States Patent Office 3,428,828
Patented Feb. 18, 1969

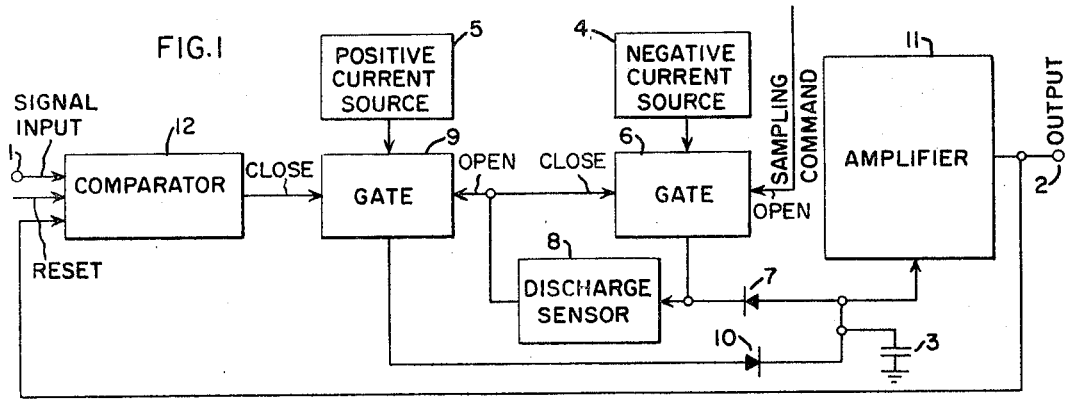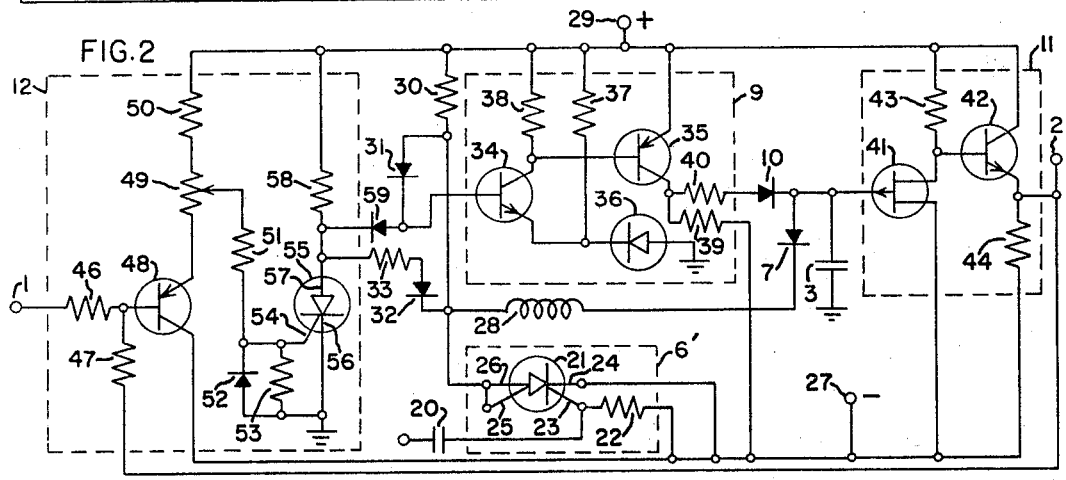

3,428,828
SAMPLE AND HOLD CIRCUIT
Sam M. Korzekwa, Baldwinsville, and Hans R. Schindler, Syracuse, N.Y., assignors to General Electric Company, a corporation of New York
Filed Aug. 27, 1965, Ser. No. 483,197
U.S. Cl. 307—235        3 Claims
Int. Cl. H03k 5/20

ABSTRACT OF THE DISCLOSURE

Circuit for sampling an analog electrical signal and accurately storing the value over an appreciable period, including gated current sources for charging and discharging the capacitor, means sensing discharge to a given level for terminating the discharge and commencing the charge, and a comparator to which are applied the circuit output and sampled voltages for terminating the charge upon these voltages becoming equal.

---

The present invention relates to sample and hold circuits of the type employed to sample the amplitude of a varying electrical signal at a given point in time and to store the sampled value for an extended length of time. In particular, the invention is directed to a novel sample and hold circuit employing a storage capacitor that may be rapidly charged to a voltage level corresponding to the present level of the applied signal, said capacitor maintaining its charge and providing an output signal having a voltage level that is closely equated to that of the applied signal sample. The charging and holding operations are performed independent of the signal source impedance. Further, a novel feedback technique is employed which eliminates many sources of error commonly found in this type circuit.

It is often a requirement to sample a rapidly varying input waveform and to store the sampled data for use at some later time. One prime example of such requirement is in computer circuitry, e.g., with respect to analog to digital converters wherein the analog signal is sampled and the samples converted into digital bits for subsequent processing. Another example is with respect to varying electrical signals representing some environmental or other condition, e.g., temperature, pressure, heart functions, etc., wherein it may be desired to record a given condition as of a given time. It may be readily appreciated that in order to perform these operations with a high degree of accuracy and stability the sampling time must be extremely short relative to the fluctuations of the signal, and the hold time must be adequately long to accommodate processing of the sampled information. With respect to the above two requirements, there are seen to be constraints present with repsect to the circuitry associated with the storage capacitor that are in conflict since they require a charge circuit having as low a time constant as possible and a discharge circuit having as high a time constant as possible. There is a further requirement of the circuit which presents still another conflicting constraint and this is that the output impedance of the circuit should be low in order to enable the sampling circuit to drive whatever load is required.

A number of approaches have been employed in the prior art in an attempt to satisfy these various constraints, but they have met with only partial success. For example, transistor switches, having an extremely low impedance in their conducting state, have been employed in the charge circuit. However, when charging the storage capacitor directly from the applied signal, the accuracy with which the voltage across the capacitor can be made to match the applied signal voltage is a function of the number of time constants over which the charge is taken. Thus, even if the charge circuit time constant is low, in order to provide an accurate sampling function several time constants must be employed for the charge period.

By coupling to the storage capacitor a high input, low output impedance amplifier, the high time constant and drive requirements of the discharge circuit are satisfied. However, high impedance amplifiers of this nature produce inaccuracies in the output voltage due to drift and offset of the capacitor voltage. Thus, although the hold characteristic is provided, the accuracy of the output voltage may be low.

The present circuit offers considerable improvement in overcoming the various limitations of the prior art and presents a simple solution for satisfying each of the above recited constraints so as to provide an accurate sample of a varying electrical signal, which sample may be held over an extended length of time.

It is accordingly an object of the invention to provide a novel sample and hold circuit by means of which a varying electrical signal can be rapidly sampled and the sample level accurately maintained over an extended length of time.

It is a further object of the invention to provide a novel sample and hold circuit as above described for sampling a varying electrical signal which includes a storage capacitor, wherein the time for charging said capacitor is extremely short and independent of signal source impedance.

It is another object of the invention to provide a novel sample and hold circuit as above described wherein a current source is employed to charge the storage capacitor, the current source being controlled by a novel circuit arrangement.

A still further object of the invention is to provide a sample and hold circuit as above described wherein the output voltage of the circuit is made to closely approximate the sampled signal voltage by means of a novel feedback arrangement.

Briefly, these and other objects of the invention are accomplished in a novel sample and hold circuit wherein the circuit's storage capacitor is charged by means of a current source that is gated on by a control signal. When the output voltage of the circuit, which corresponds to but is not necessarily equal to the voltage across the storage capacitor, becomes equal in magnitude to the sampled signal voltage, a comparison of the two voltages generates a further control signal which gates off the current source and the charge process is terminated.

Considering a more detailed explanation of the circuit, there is provided a first gate coupled to a negative current source, which gate is opened in response to a sampling command signal for discharging the storage capacitor to a voltage level below the range in which the input signal to be sampled is known to exist. The end of the discharge process is detected by a sensing means which thereupon closes the first gate and opens a second gate that is connected to a positive current source. With the second gate opened, the positive current source acts to rapidly charge the storage capacitor. The capacitor is further coupled to a high input impedance, low output impedance amplifier having a gain of approximately unity. The amplifier output, from which the output of the circuit is taken, is fed back and coupled to a comparator network to which is also coupled the input signal. From the comparator network is derived a control signal for closing the second gate and terminating the charge process when the two inputs to the comparator become equal. In this manner there is accomplished the rapid generation of an output voltage having a magnitude that is certain to be closely matched to that of the sampled input voltage.

While the specification concludes with claims which set forth the invention with particularity, it is believed that the invention, both as to its organization and method of operation, will be better understood from the following description taken in connection with the accompanying drawings in which:

FIGURE 1 is a schematic block diagram of a sample and hold circuit in accordance with the invention;

FIGURE 2 is a schematic circuit diagram corresponding to the block diagram of FIGURE 1; and FIGURE 3 is a series of waveforms employed in describing the invention.

With reference to FIGURE 1, there is illustrated in block diagram form a sample and hold circuit wherein a varying electrical input signal applied to input terminal 1 can be accurately and rapidly sampled and the resulting output voltage appearing at output terminal 2 maintained at the sampled value for an extended length of time.

In the sampling process a storage capacitor 3 is rapidly charged to a level corresponding to the amplitude of the input signal at a given point in time. A negative current source 4 and a positive current source 5 are employed in this operation, the negative source 4 acting to erase the previously stored information and the positive source 5 being used to store the most recent sampled information. The use of current sources produces essentially a ramp function for both the charge and discharge process. The slope of the ramp can be readily adjusted so that the rate of charge and discharge is established in accordance with the requirements of the circuit and the overall operation.

The negative current source 4 is serially connected through a gate 6 and a diode 7 to one terminal of storage capacitor 1, the other terminal of the capacitor being connected to ground. The diode 7 is poled so as to permit easy current flow therethrough. A sampling command signal is applied to gate 6 for opening the gate and thereby discharging the storage capacitor 3. The output of gate 6 is further connected to a sensing means 8 for detecting a discharged condition of the capacitor 3. The sensing means 8 is constructed so that at a predetermined level of discharge of the capacitor 3, which would be below the range of the input signal, the circuit is operative to apply a control signal to gate 6 for closing this gate and terminating the discharge process, and to apply a second control signal to a second gate 9 for opening this gate and initiating the charge process. The positive current source 5 is serially connected through gate 9 and a diode 10 to said one terminal of capacitor 3, the diode 10 being poled in the direction for easy current flow. Upon gate 9 becoming opened, the positive current source 5 charges the storage capacitor through diode 10. Diodes 7 and 10 are extremely low leakage components which act to improve the performance of gates 6 and 9.

The ungrounded terminal of capacitor 3 is connected to a high input impedance, low output impedance amplifier network 11, which is also typically a unity gain amplifier. The output of amplifier 11 is connected to output terminal 2. The function of amplifier network 11 is to allow the voltage samples to be read out and applied to successive stages without disturbing the charge across the capacitor.

A comparator network 12 is provided having as a first input thereto the input signal voltage connected from input terminal 1, and as a second input the output voltage connected from output terminal 2. Network 12 generates a third control signal which is connected to the gate 9 and closes this gate upon the output voltage becoming equal to the input voltage. When this condition occurs the charge process ceases and the voltage across the capacitor 3, as well as the output voltage at terminal 2, becomes fixed. The output voltage is fixed at the level of the sampled input signal, and the capacitor voltage is fixed at a level that is a constant offset from this value.

In the present circuit it is of no consequence that the capacitor voltage is offset from the output voltage so long as the capacitor holds its charge, since it is the output voltage and not the capacitor voltage that is equated to the input voltage.

It may be appreciated that the feedback connection offers a distinct advantage to the circuit in that it eliminates from the output numerous errors that might otherwise occur because of inaccuracies and instabilities in the output amplifier and other portions of the charge and hold circuitry. Thus, the accuracy of the output sample depends almost entirely upon a threshold operation of the comparator network, to be considered in greater detail when describing FIGURE 2, and such operation can readily be made highly accurate.

A latching operation is provided with respect to gate 9 so that once closed it remains so until the next sampling period is commenced. In this manner no change in output signal can occur between sampling times due to variations in the input. In the present circuit, latching of gate 2 is accomplished by means of the comparator network 12, which must accordingly be reset between each sample taking as by a reset signal applied thereto. This will be more clearly understood when considering FIGURE 2.

In FIGURE 2 there is illustrated a schematic circuit diagram which generally conforms to the block diagram of FIGURE 1. The components appearing in FIGURE 2 that are identical to those in FIGURE 1 are given the same reference characters. The sampling command signal is connected through a capacitor 20 to the first gate 6', which is similar to gate 6 of FIGURE 1 but, as will be seen, also provides the end of discharge sensing function of block 8 of FIGURE 1. Gate 6' is shown as including a silicon controlled switch 21 and a bias resistor 22. Silicon controlled switch 21 includes a cathode gate 23, a cathode 24, an anode gate 25 and an anode 26, a direct connection being made between anode gate 25 and anode 26. Cathode 24 is connected to a terminal 27 of negative voltage, the terminal 27 being connected by resistor 22 to the cathode gate 23. A first connection to anode 26 is made from capacitor 3 through diode 7 and a serially coupled current suppressing inductor 28 for providing a discharge path for the capacitor. A second connection is made from anode 26 to a terminal 29 of positive potential for controlling the actuation of the second gate 9. Thus, positive voltage terminal 29 is connected to anode 26 through a bias resistor 30, the junction of resistor 30 and anode 26 being connected through a diode 31, poled in the forward direction, to gate 9. A still further connection from anode 26 is made to the comparator network 12 for providing a reset of this network. This connection to the comparator is through the series connection of a forward poled diode 32 and a resistor 33.

The second gate 9 which controls the charge process of capacitor 3 includes an npn transistor 34 and a pnp transistor 35. The base of transistor 34 is connected to diode 31 for receiving a control signal. The emitter of transistor 34 is connected through a Zener diode 36 to ground and through a bias resistor 37 to positive voltage terminal 29. The collector of transistor 34 is connected by a bias resistor 38 to terminal 29, and is also connected to the base of pnp transistor 35. The emitter of transistor 35 is directly connected to terminal 29. The collector of transistor 35 is connected by a bias resistor 39 to negative voltage terminal 27 and through the series connection of a current limiting resistor 40 and diode 10 to the ungrounded terminal of capacitor 3. Capacitor 3 is connected to output amplifier network 11. Network 11, which presents a high input impedance to the capacitor 3 and a low output impedance to whatever load may be applied, includes a field effect transistor 41 connected in cascade with an emitter follower arranged transistor 42. The ungrounded terminal of capacitor 3 is connected to the gate electrode of transistor 41, the drain electrode being connected to terminal 27. The source electrode is connected through a bias resistor 43 to terminal 29 and to the base of transistor 42. The collector of transistor 42 is connected to terminal 29 and the emitter is connected through a bias resistor 44 to terminal 27. The output of the circuit is taken from the emitter of transistor 42 at output terminal 2.

A feedback connection is made from the emitter of transistor 42 to the comparator network 12 for terminating the charge on the capacitor when the output voltage becomes equal to the input voltage that is being sampled. Network 12 includes a pair of matched resistors 46 and 47. To one terminal of resistor 46 is connected the input signal and to one terminal of resistor 47 is connected the output signal, the opposite terminals of these resistors being joined to the base of a pnp transistor 48. The collector of transistor 48 is connected to negative potential terminal 27 and the emitter is connected through a potentiometer 49 and a serially connected bias resistor 50 to positive potential terminal 29. A tap on potentiometer 49 is connected through current limiting resistor 51 and a serially connected diode 52, poled in the backward direction, to ground. Across diode 52 is connected a resistor 53 which, together with potentiometer 49, provides adjustment in the operation of transistor 48. The ungrounded terminal of diode 52 is further connected to the cathode gate 54 of a silicon controlled switch 55. The cathode 56 of switch 55 is connected to ground. The anode 57 is connected through a bias resistor 58 to terminal 29. The anode 57 is further connected through a diode 59 to the base of transistor 34 of gate 9 for terminating actuation of gate 9. Anode 57 is also connected to resistor 33 for providing a reset of the comparator network.

In the operation of the circuit of FIGURE 2 it may be assumed that at time $T_0$ a given voltage sample is held across capacitor 3 and at the output terminal 2. An exemplary waveform of the input voltage being sampled is shown in graph $a$ of FIGURE 3, and the output voltage is shown in graph $b$. It will be observed that the output voltage is of opposite polarity with respect to the input voltage due to the particular circuit construction disclosed. The phase relationship between input and output voltage is normally of small consequence. However, if desired, the voltages can readily be made to have the same polarity, e.g., by introducing a phase inversion in both the output amplifier network 11 and the comparator network 12. At time $T_1$ a sampling command pulse, as shown in graph $c$ of FIGURE 3, is applied to silicon controlled switch 21 of gate 6' for triggering this switch into its conducting state. A path is then provided through diode 7, inductor 28 and switch 21 for discharging the capacitor 3. In addition, conduction of switch 21 draws current through resistor 33 and diode 32 for turning off switch 55 of comparator network 12.

As the capacitor discharges, the output voltage correspondingly follows and falls from the level of sample No. 1, as illustrated by the waveform of graph $b$ between times $T_1$ and $T_2$. When at $T_2$ the capacitor discharges to a predetermined negative level whereby insufficient current is available for the switch 21, the switch turns itself off and reverts to a nonconducting state. In this instance, the predetermined level has a magnitude greater than the magnitude of the highest positive level that the input voltage will reach. With both switches 21 and 55 in the nonconducting state, a current path is provided from positive potential terminal 29 through resistor 30 and diode 31 to the transistor 34 and gate 9 becomes actuated. The voltage pulse appearing at the base of transistor 34 is shown by graph $d$ of FIGURE 3. Thus, transistor 34 is turned on at time $T_2$ which subsequently turns on transistor 35 to provide a charge path from terminal 29 through transistor 35, resistor 40 and diode 10 to capacitor 3. The capacitor then charges along essentially a ramp function and as it does the output voltage correspondingly rises, as shown by graph $b$ of FIGURE 3 commencing at time $T_2$. Since the capacitor is charged by a current source that is circuitwise unrelated to the input signal being sampled, considerable flexibility is provided with respect to the time constant of the charge circuit and the charge ramp function can be made essentially as steep as circuit requirements demand.

As the output voltage increases in the positive sense, the voltage at the base of transistor 48 of comparator network 12 and the voltage at the cathode gate 54 of silicon controlled switch 55 also increase. Upon the output voltage becoming equal in magnitude to the input voltage, a threshold point is reached at the base of transistor 48 which causes the switch 55 to be triggered to its on condition. In the described embodiment, with resistors 46 and 47 equal, a null threshold is provided. A precise control of the null threshold is established by the bias resistor values associated with transistor 48 and switch 55 and a careful adjustment of the potentiometer 49. Upon silicon control switch 55 turning on there is provided a conduction path through diode 59 that draws current from the base of transistor 34 of gate 9 and turns this gate off. The charge process is thereby terminated, which occurs at $T_3$ in FIGURE 3. Gate 9 will remain closed until the succeeding sampling period when the turning off of silicon controlled switch 21 of gate 6' causes gate 9 to open. The voltage across the capacitor, and in turn the output voltage illustrated as sample No. 2 in graph $b$ of FIGURE 3, will be maintained for an extended time due to the high input impedance of the amplifier 11.

At time $T_4$ the circuit is triggered so as to obtain a further sample of the input signal. In the identical manner above described, sample No. 3, shown in FIGURE 3, is obtained as the capacitor 3 is again cleared of charge at time $T_5$ and then charged to a voltage level corresponding to the input signal level at time $T_6$. In a typical application of the circuit, the process will be repeated many times, the taking of each sample being initiated by a sampling command pulse.

In one exemplary operable embodiment of the circuit of FIGURE 2 the following circuit components and values are employed. These are presented for the purpose of example and should not be construed as limiting.

| | |
|---|---|
| Silicon controlled switches 21 and 55, pnpn silicon type | 3N60 |
| Transistors 34 and 42, npn type | 2N2924 |
| Field effect transistor 41, type | 2N2497 |
| Transistor 48, pnp type | 2N2603 |
| Diodes 7 and 10 | FD300 |
| Diodes 31, 52 and 59 | IN914 |
| Zener diode 36 | IN748 |
| Resistor 22, ohm | 1K |
| Resistor 30, ohms | 160K |
| Resistor 33, ohms | 5.6K |
| Resistors 37, 38, 39, 43, 50, ohms | 10K |
| Resistor 40, ohms | 510 |
| Resistor 44, ohms | 1.6K |
| Resistors 46 and 47, ohms | 36.5K |
| Resistor 49, ohm | 0–1K |
| Resistor 51, ohms | 2K |
| Resistor 53, ohms | 3.6K |
| Resistor 58, ohms | 6K |
| Capacitor 3, microfarads | 5 |
| Capacitor 20, microfarad | .01 |
| Inductor 28, microhenries | 14 |
| Positive terminal 29, volts | +8 |
| Negative terminal 27, volts | −8 |

The appended claims are intended to include all modifications and variations of the disclosed circuitry that may fall within the true scope of the invention.

What we claim as new and desire to secure by Letters Patent of the United States is:

1. A sample and hold circuit for sampling an applied electrical signal and storing the sample value, comprising:
   (a) a storage capacitor, (b) first circuit means for applying charge to said capacitor, (c) first gate means having two discrete operating states coupling said first circuit means to said capacitor, (d) second circuit means for discharging said capacitor, (e) second gate means having two discrete operating states coupling said second circuit means to said capacitor, said second gate means being opened in response to a command signal so as to discharge said capacitor, (f) means responsive to discharge of said capacitor to a predetermined level for successively closing said second gate and opening said first gate, so as to initiate charging of the capacitor from said predetermined level, (g) output means coupled to said capacitor from which is obtained an output signal having a voltage related to the charge on said capacitor, (h) comparator means for comparing the voltage of said output signal with that of said applied signal for generating a control signal upon the voltages of said output and applied signals becoming equal, and (i) means for applying said control signal to said first gate means for closing this gate and terminating the charge process.

2. A sample and hold circuit as in claim 1 wherein said first and second circuit means include positive and negative current sources.

3. A sample and hold circuit as in claim 2 wherein said first and second gate means include semiconductor switching components.

References Cited

UNITED STATES PATENTS

| 2,767,311 | 10/1956 | Meyer | 328—67 |
| 2,834,883 | 5/1958 | Lukoff | 328—151 |
| 3,053,996 | 9/1962 | Stefanov | 307—318 |
| 3,348,216 | 10/1967 | Vinson | 328—151 |

ARTHUR GAUSS, *Primary Examiner.*

H. A. DIXON, *Assistant Examiner.*

U.S. Cl. X.R.

328—151